United States Patent

Hayashi et al.

[11] Patent Number: 5,834,896
[45] Date of Patent: Nov. 10, 1998

[54] PLASMA DISPLAY WITH BARRIER RIBS

[75] Inventors: Masatake Hayashi; Atsushi Seki, both of Kanagawa, Japan

[73] Assignee: Sony Corporation, Tokyo, Japan

[21] Appl. No.: 954,992

[22] Filed: Oct. 14, 1997

Related U.S. Application Data

[63] Continuation of Ser. No. 644,957, May 13, 1996, abandoned.

[30]    Foreign Application Priority Data

May 12, 1995  [JP]  Japan .................................. 7-138708

[51] Int. Cl.⁶ ...................................................... H01J 17/49
[52] U.S. Cl. ............................................. 313/585; 313/586
[58] Field of Search ..................................... 313/484, 494, 313/582, 583, 584, 585, 586, 587; 315/169.4

[56]    References Cited

U.S. PATENT DOCUMENTS

| 4,516,053 | 5/1985  | Amano         | 313/584   |
|-----------|---------|---------------|-----------|
| 5,077,553 | 12/1991 | Buzak         | 345/87    |
| 5,349,455 | 9/1994  | Hayashi et al.| 315/169.4 |
| 5,351,144 | 9/1994  | Tanamachi     | 315/169.4 |
| 5,383,040 | 1/1995  | Kim           | 313/586   |
| 5,495,142 | 2/1996  | Hayashi       | 313/584   |
| 5,525,862 | 6/1996  | Miyazaki      | 313/584   |

FOREIGN PATENT DOCUMENTS

| 0 500 085 | 8/1992  | European Pat. Off. | G02F 1/33 |
| 0 613 165 | 8/1994  | European Pat. Off. | H01J 17/48 |
| 0 628 944 | 12/1994 | European Pat. Off. | G09G 3/36 |

*Primary Examiner*—Sandra L. O'Shea
*Assistant Examiner*—Michael Day
*Attorney, Agent, or Firm*—Hill & Simpson

[57]    ABSTRACT

A discharge panel (2) includes substrates (3, 8) bonded together with a gap and ionizable gas sealed within the gap. Discharge electrodes including an anode (9) and a cathode (9a) having a strip pattern are formed on the lower substrate (8) so as to divide the gap into discharge channels (12). A barrier rib (10) is disposed over each anode (9) covering one side wall of the anode (9) so that a portion is exposed to the ionizable gas in the discharge channel (12). The cathodes (9a) are free of the barrier ribs (10) and are exposed to the ionizable gas in the discharge channel (12). The elimination of barrier ribs (10) from the cathodes (9a) increases the effective display region. In an alternate embodiment, the barrier ribs (10), the anodes (9) and a cathodes (9a) are of the same width and same pitch, and provide for a simplification in the manufacturing process.

5 Claims, 5 Drawing Sheets

PLASMA DISPLAY WITH BARRIER RIBS

This is a continuation, of application Ser. No. 08/644,957, filed May 13, 1996, now abandoned.

BACKGROUND OF THE INVENTION

1. Field of the Invention

The present invention relates generally to a discharge panel, and more particularly relates to the structure of discharge electrodes formed within a discharge panel.

2. Description of the Related Art

Discharge panels can be used in plasma displays, etc. and development in this field has been progressing since recent times. Research has also been progressing in recent years with regard to plasma addressed display devices where a liquid crystal panel and a discharge channel are laminated so as to expand the range of applications for discharge channels. FIG. 4 shows an example of a conventional discharge channel for application in a plasma display. As shown in FIG. 4, a discharge channel 102 includes a pair of substrates 108 and 113 bonded together with a gap space, with ionizable gas being sealed within the gap space. The gap space is partitioned by barrier ribs 110 interposed between the substrates 108 and 113 so as to form dot-shaped or stripe-shaped discharge cells 112. Discharge electrodes 109a are formed at the inner surface of the substrate 108, with discharge electrodes 109b being formed at the inner surface of the other substrate 113. These discharge electrodes 109a and 109b are arranged to face to each other within each of the discharge cells 112, so that the gas within the gap is ionized in response to an externally applied voltage to thereby generate plasma discharge. Further, a fluorescent film 120 is formed at the surface of the substrates 108 within each of the discharge cells 112 so as to form a pixel. Ultraviolet rays generated due to the plasma discharge then cause the fluorescent film 120 to become excited to display the desired images.

With plasma displays in which the display is carried out directly using the plasma discharges of the discharge panel, if the width of the discharge electrodes 109a is made larger, the effective light emitting area becomes narrower because surface area occupied by the fluorescent film 120 is sacrificed as a result. The open surface area at a top side to which a liquid crystal panel could be applied also becomes narrow as a result of the discharge electrodes becoming wide in a plasma-addressed display devices in which the discharge panel is used for liquid crystal panel linear-sequential addressing. Conversely, if the discharge electrodes are made narrow to enlarge the effective luminescent region and the surface area of the openings, the electrical resistance increases and there may occur uneven plasma discharges which effect the operating characteristics. Further, if the width of the discharge electrodes is made extremely small, interruptions in the wiring may also occur.

SUMMARY OF THE INVENTION

The present invention therefore proposes the following means in order to resolve the aforementioned problems with the conventional technology. i.e. according to one aspect of the present invention, a discharge panel basically comprises a pair of substrates bonded together with a gap therebetween to form a cell, ionizable gas sealed within the cell, discharge electrodes having a striped pattern formed on at least one of the substrates and striped-pattern barrier ribs formed in a similar manner on the same substrate parallel to the discharge electrodes so as to divide the cell to thereby define discharge channels. A feature of the invention resides in that portions of the discharge electrodes are covered by corresponding barrier ribs and the remaining portions thereof are exposed within the discharge channels. Also, other discharge electrodes are formed at the discharge channel on the same substrates so as to run parallel with the exposed portions of the discharge electrodes in such a manner as to make up pairs of anodes and cathodes, with plasma discharges then being generated by ionizable gas sealed in the discharge channels. Further, the barrier ribs, the discharge electrodes acting as the anodes and the discharge electrodes acting as the cathodes are designed to have the same stripe pattern so as to be sequentially print-formed using a common screen mask.

According to a further aspect of the present invention, a discharge panel basically comprises a pair of substrates bonded together with a gap therebetween to form a cell, ionizable gas sealed within the cell, discharge electrodes having a striped pattern formed on at least one of the substrates and striped-pattern barrier ribs formed in a similar manner on the same substrate parallel to the discharge electrodes so as to divide the cell to thereby define discharge channels. A feature of the invention resides in that the discharge electrodes are arranged alternately as anodes and cathodes of different widths in such a manner as to make up pairs, with the gas sealed within the discharge panels being ionized to generate plasma discharges. Also, the wide electrodes are covered by corresponding barrier ribs with only the side surfaces being exposed within the discharge channels. The narrow discharge electrodes are interposed between neighboring barrier ribs with the surfaces of the narrow discharge electrodes being exposed within the discharge channels. The barrier ribs and the wide and narrow discharge electrodes which all are formed by a mask having the same stripe pattern, can be sequentially print-formed using a common screen mask.

According to one aspect of the present invention, portions of the discharge electrodes that act as anodes are covered by the barrier ribs and only the remaining portions are exposed within the discharge channels. In other words, discharge electrodes that act as anodes and the barrier ribs are partially overlapping thereby reducing the area of non-display region occupied on the substrate. The effective display region for use as a display, etc. is therefore enlarged. According to another aspect of this invention, the barrier ribs completely overlie the discharge electrodes that act as anodes so that just the side surfaces of the discharge electrodes that act as the anodes are exposed within the discharge channels. In other words, the barrier ribs and the anode side discharge electrodes overlap completely in a plan view thereof, the area of the non-display region thus reduced thereby enlarging the effective display region. Further, with either embodiment, the barrier ribs and the discharge electrodes have the same stripe pattern, i.e., the individual stripe patterns have the same width and the same pitch. However, it should be noted that the spatial phase of the stripe pattern is deviated in the barrier ribs from the arrangement of the discharge electrodes. In other words, the stripe pattern of the screen mask is shifted from the position for forming the display electrodes to a shifted position forming the barrier ribs. With this kind of structure, the discharge electrodes and the barrier ribs can be screen-printed sequentially using a common screen mask.

DETAILED DESCRIPTION OF THE PREFERRED EMBODIMENTS

Figure 1:
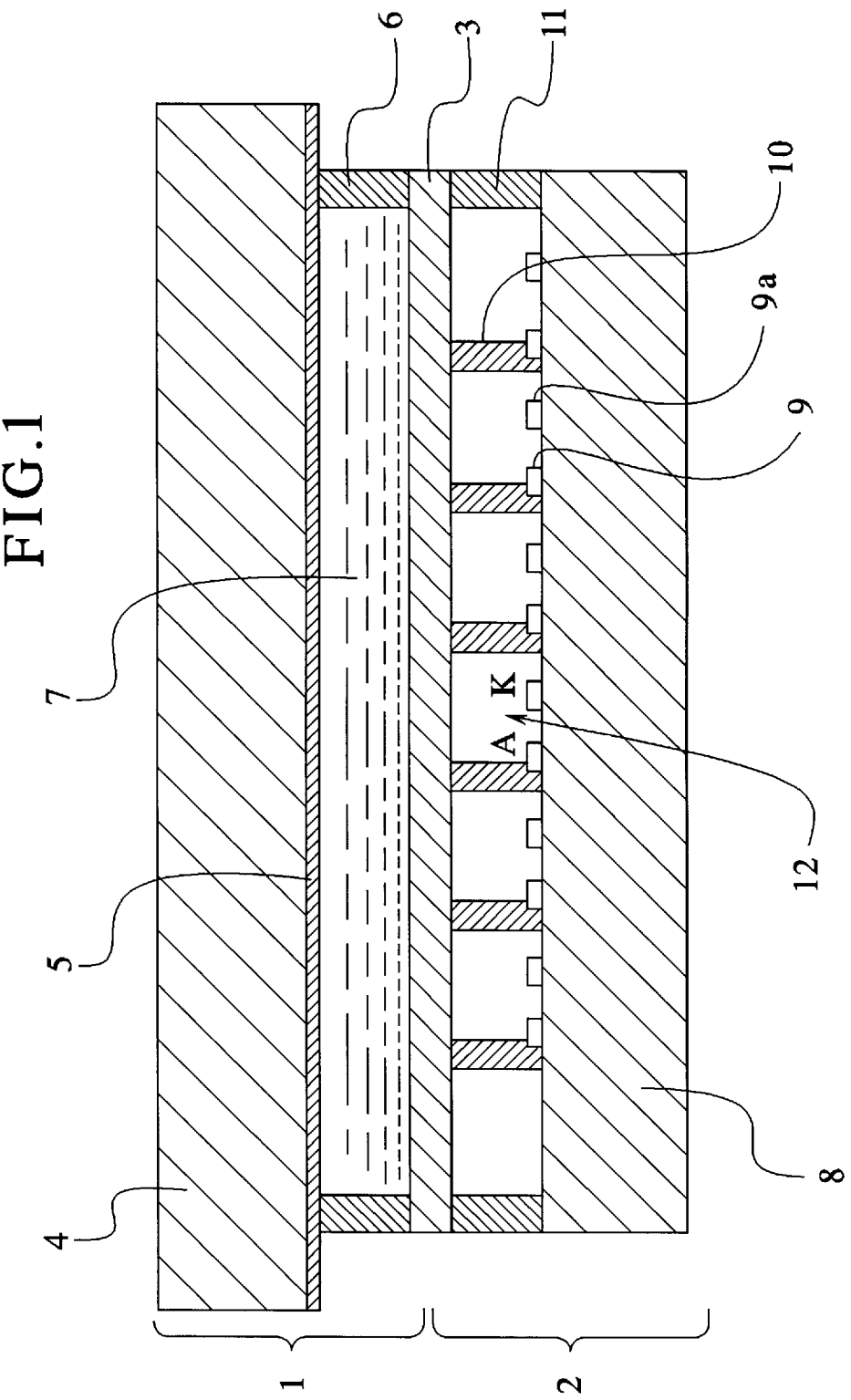
FIG. 1 is a schematic cross-sectional view showing the first embodiment of a discharge panel of the present invention.

Preferred embodiments of the present invention will be described with reference to the accompanying drawings in detail. FIG. 1 is a schematic diagram showing a cross-sectional view of a first embodiment of the discharge panel according to the present invention. This embodiment is a discharge panel applied to a plasma-addressed display device. However, the present invention is by no means limited in this respect and may, of course, also be applicable to a plasma display having a single discharge panel. As shown in FIG. 1, the plasma-addressed display device has a flat structure with a liquid crystal panel 1 and a discharge panel 2 laminated together so as to have interposed an intermediate substrate 3 of a thin glass plate. The liquid crystal cell 1 includes an upper substrate 4 of glass, etc., with a plurality of display electrodes 5 of a transparent electrically conducting film being formed in parallel along the row direction. The upper substrate 4 is adhered to the intermediate substrate 3 with a prescribed gap therebetween using seal members 6 to form a cell and the cell is then filled up with liquid crystal material 7.

On the other hand, the discharge panel 2 is constructed using a lower substrate 8 of glass, etc. Discharge electrodes 9 and 9a are formed at the main inner surface of the lower substrate 8 so as to extend along the column direction and, thus, be orthogonal relative to the display electrodes 5. These discharge electrodes 9 and 9a act as anodes A and cathodes K, respectively, to generate plasma discharges. Barrier ribs 10 are formed along the direction of the discharge electrodes 9 so as on overlap with parts of the discharge electrodes 9. The tops of the barrier ribs 10 come into contact with the intermediate substrate 3 so as to act as spacers between the lower substrate 8 and the intermediate substrate 3. The lower substrate 8 is bonded to the intermediate substrate 3 using a glass frit 11 so that an air-tight cell is formed therebetween. This cell is partitioned by the barrier ribs 10 so as to define individual discharge channels 12. Ionizable gas such as, for example, helium, neon, argon, or a compound thereof, is sealed within the air-tight cell.

Significant features of the invention are that a portion of each of the discharge electrodes 9 is covered by the corresponding barrier rib 10 and the remaining portion is exposed within the discharge channel 12. Another discharge electrode 9a is formed at the lower substrate 8 so as to run parallel with the exposed side of the discharge electrode 9 within each of the discharge channels 12. The discharge electrodes 9 and 9a make up pairs, each including an anode A and a cathode K. The gas which is hermetically sealed within the discharge channel 12 is then ionized to generate a plasma discharge. It is preferable if the barrier ribs 10, the discharge electrodes 9 which act as anodes and the discharge electrodes 9a which act as cathodes all have the same stripe pattern and are sequentially printed using a common screen mask. Screen printing is repeatedly carried out until the barrier ribs 10 reach the prescribed height.

As described above, according to the present invention, one of the discharge electrodes 9 in each of the channels 12 is partially concealed by the barrier rib 10 in each discharge channel 12, with a surface of the discharge electrode 9 being exposed from one side of the barrier rib 10. In this way, in the case where the discharge electrodes 9 are printed so as to be formed with a prescribed stripe pattern width, the reduction in the active screen surface area becomes less. In other words, the active screen area is greater. The anode side discharge electrodes 9, the cathode side discharge electrodes 9a and the barrier ribs 10 may be formed by printing employing separate screen masks for each. However, in the case of this example, the anode side discharge electrodes 9 and the cathode side discharge electrodes 9a are sequentially formed using a single screen mask and the barrier ribs 10 are then formed. The single screen mask has stripe-shaped openings arranged at a pitch corresponding to the spacing of the barrier ribs 10. In this way, when printing is carried out using a single screen mask, the relative pitch accuracy between the barrier ribs 10 and the discharge electrodes 9 and 9a is not a problem and high precision alignment is therefore possible.

Figure 2:
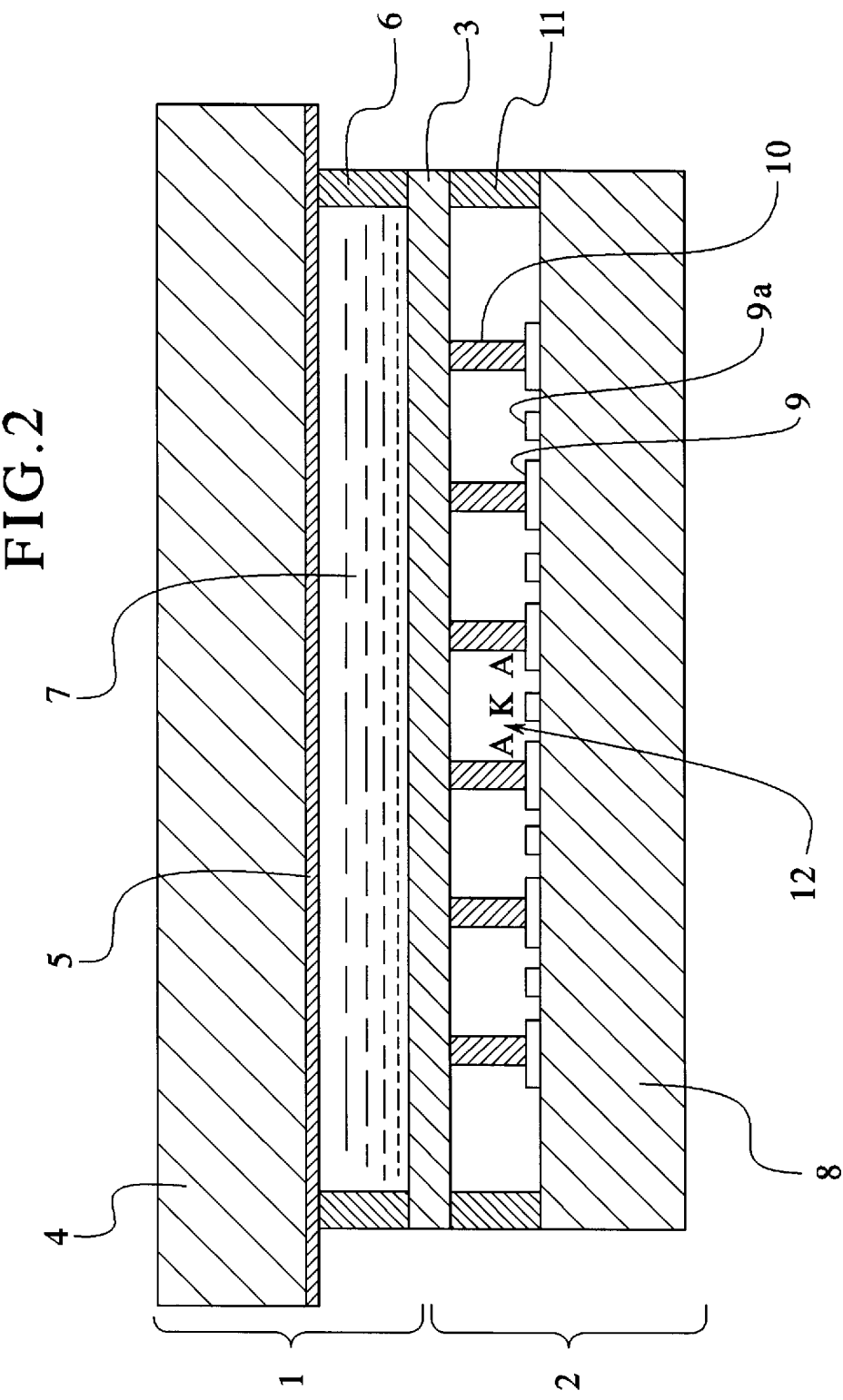
FIG. 2 is a schematic cross-sectional view showing a modification example of the discharge panel.

FIG. 2 is a schematic cross-sectional view showing a modified example of a plasma-addressed display device. The basic structure is the same as for the first embodiment of the plasma-addressed display device of the present invention shown in FIG. 1 and the corresponding portions bear the corresponding reference numerals for ease of understanding. The difference, however, is that the discharge electrodes 9 formed at the lower substrate 8 of the discharge panel 2 are exposed from both sides of the barrier ribs 10. Therefore, considering one of the discharge channels 12, plasma discharges are generated among the two anodes A protruding from neighboring barrier ribs 10 and the cathode K interposed therebetween. However, with this construction, the surface area occupied by the anodes A is relatively larger when compared with the first embodiment of FIG. 1 and the effective open area is restricted. In addition, the same screen mask cannot be used because the stripe pattern width of the barrier ribs 10 and that of the discharge electrodes 9 are different from each other.

Figure 3:
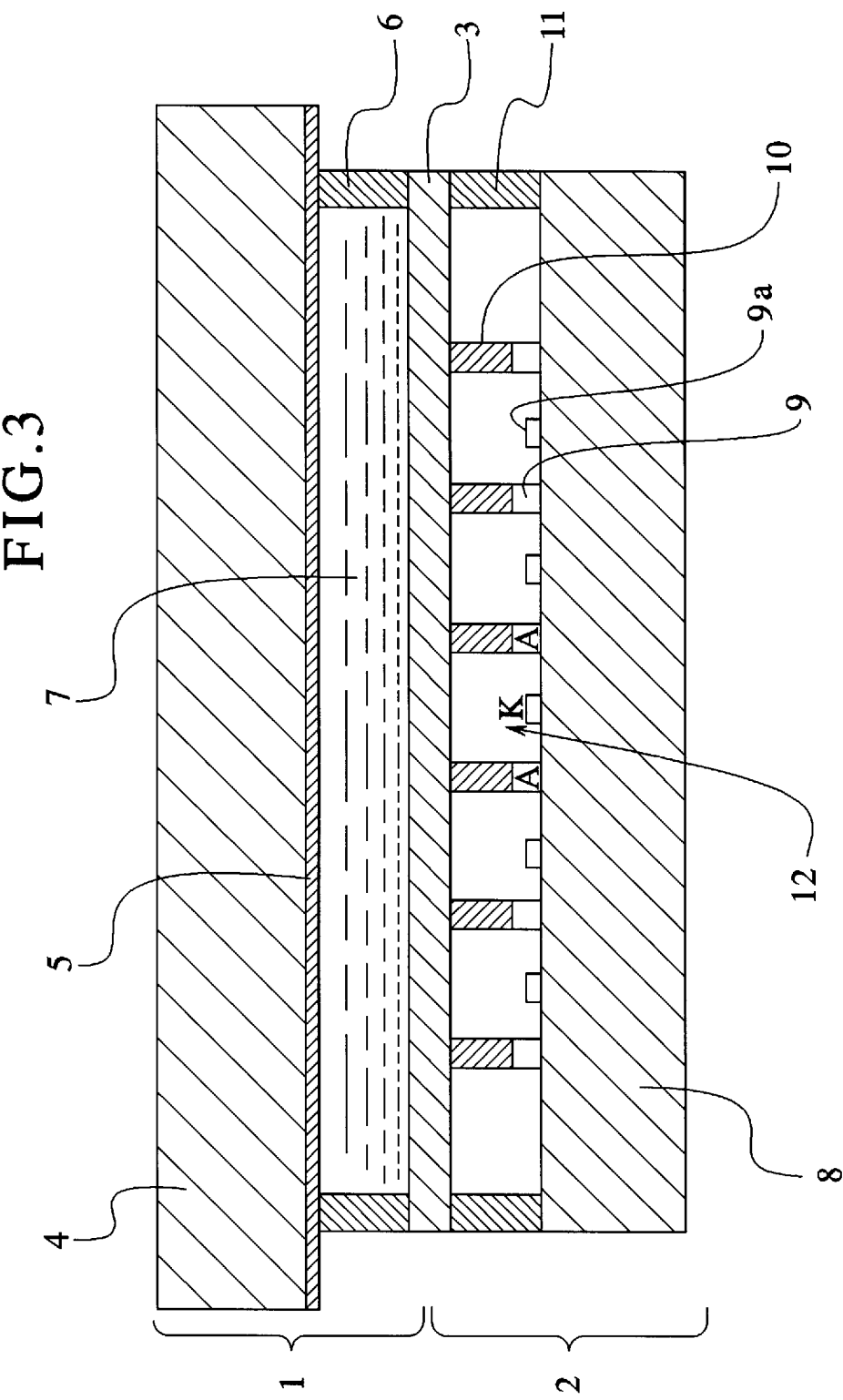
FIG. 3 is a schematic cross-sectional view showing a second embodiment of a discharge panel of the present invention.
Figure 4:
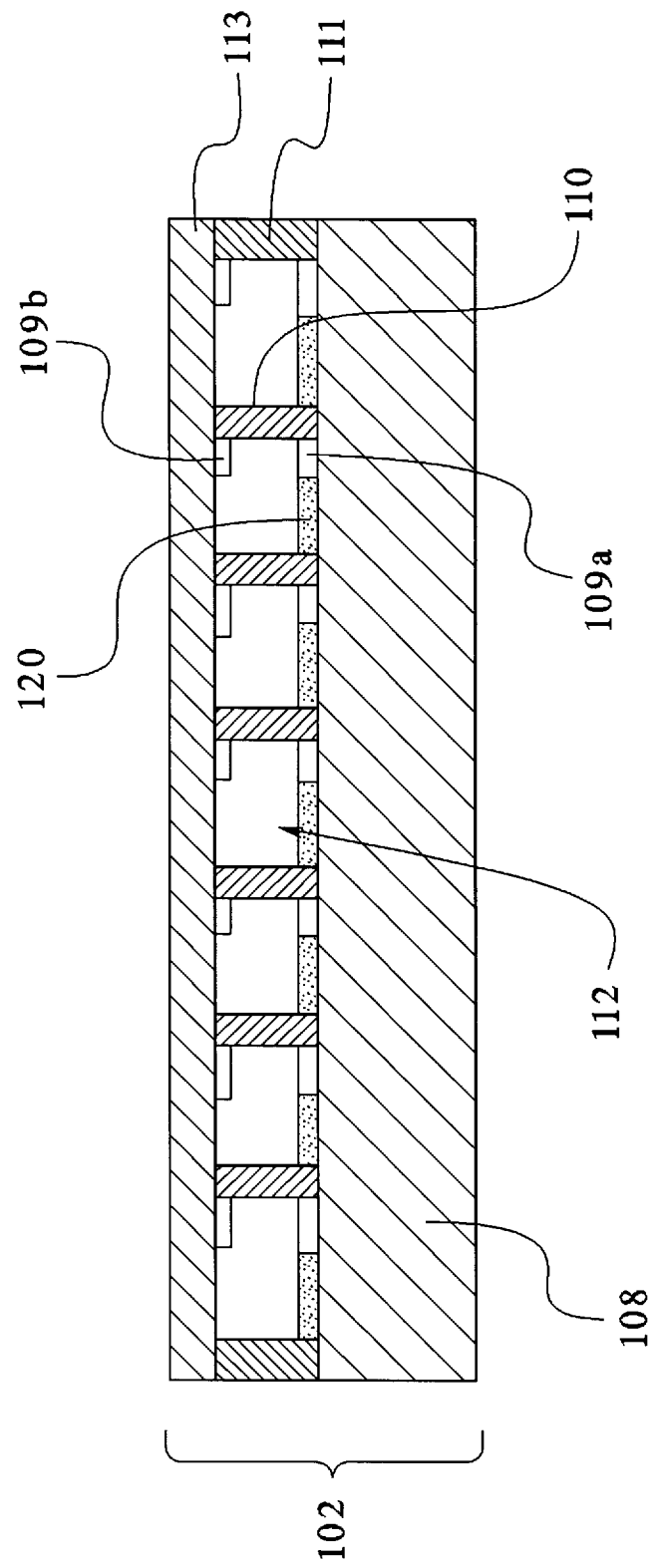
FIG. 4 is a schematic cross-sectional view showing a conventional discharge panel.

FIG. 3 is a schematic cross-sectional view showing a second embodiment of a discharge panel of the present invention. The discharge panel is utilized in a plasma-addressed display device as shown and the basic structure is thus the same as for the first embodiment shown in FIG. 1. Corresponding portions therefore bear the corresponding numerals for ease of understanding. As shown in FIG. 3, the discharge panel 2 includes an intermediate substrate 3 and a lower substrate 8 bonded together with a gap therebetween, ionizable gas sealed within the gap, discharge electrodes 9 and 9a having stripe patterns, which are formed on the lower substrate 8, and stripe patterned barrier ribs 10 also formed on the lower substrate 8 in parallel with the discharge electrodes 9 and 9a so as to divide up the gap in such a manner as to define discharge channels 12. The discharge electrodes 9 and 9a are anodes A and cathodes K of different thicknesses arranged alternately in pairs. The gas sealed in the discharge channels 12 is then ionized to generate plasma discharges. Significant features of the second embodiment of the present invention are that the top surfaces of the thick discharge electrodes (the anodes A) 9 are covered by the corresponding barrier ribs 10, with the side surfaces thereby only being exposed within the discharge channels 12, thin discharge electrodes (cathodes K) 9a are then interposed between neighboring spacing walls 10, and the surfaces of these discharge electrodes 9a are exposed within the discharge channels 12. Further, the barrier ribs 10, the thick discharge electrodes 9 and the thin discharge electrodes 9a all have the same stripe pattern, and sequential printing using a common screen mask is thus possible to form them. For example, first, electrically conductive paste is print-transferred onto the lower substrate 8 using a screen mask having a stripe pattern to form the discharge electrodes 9a which act as the cathode K. Next, the conductive paste is transferred to the lower substrate 8 while maintaining a half-pitch shift and using the same screen mask. The thick discharge electrodes 9 are then formed by repeating this print transfer several times. Further, insulating paste is then repeatedly print-transferred using the same screen mask until the barrier walls 10 are piled up, or accumulated, to the desired height. In this way, with the discharge electrode structure formed, plasma discharges are generated in each of the discharge channels 12 among the side surface of the anodes A running along the discharge channel so as to be exposed from both sides of the discharge channel and the surface of the cathode K interposing both of these anodes A. As then becomes clear when comparison is made with the modification of FIG. 2, the surface area occupied by the anodes A is made smaller, and the effective display region is thus enlarged. Generally, in this embodiment, the thickness of the discharge electrodes 9a that act as the cathode is required to be made less than the thickness of the discharge electrodes 9 that act as the anode. It is necessary for the following conditions to be fulfilled in a plasma-addressed display device. The thickness of the cathode K positioned at the center of each discharge channel 12 is made as small as possible to thereby obtain the desired view angle. Further, the discharge current can be reduced and the service life of the discharge channel 2 can be prolonged because the exposed surface area of the cathodes K has been made smaller. The service life of the discharge channel 2 is generally determined by the speed at which the discharge electrodes 9a are sputtered with the plasma. The faster the sputtering, then the shorter the service life of the display. Therefore, the service life is effectively made longer by making the exposed surface area of the cathodes K small to reduce the discharge current thereby controlling the sputtering speed.

As described above, according to the present invention, in the electrode structure of a discharge panel, stripe-shaped anodes are formed underneath the barrier ribs with one side of the anodes being partially exposed from the barrier ribs. With this structure, the electrical resistance of the discharge electrodes can be lowered and the effective screen surface ratio can be improved. Further, the barrier ribs and the discharge electrodes can be formed using a single screen mask. According to a further aspect of this invention, discharge electrodes (anodes) of the same width as the spacing wall, or barrier rib, are formed underneath the stripe-shaped spacing wall. Moreover, discharge electrodes that act as cathodes that are thinner than the discharge electrodes that act as anodes are formed between neighboring barrier ribs. The openings or effective light-emitting parts of the display are therefore enlarged with this arrangement of electrodes and barrier ribs and it is advantageous in that the discharge electrodes can be printed using a single screen mask.

Figure 5:
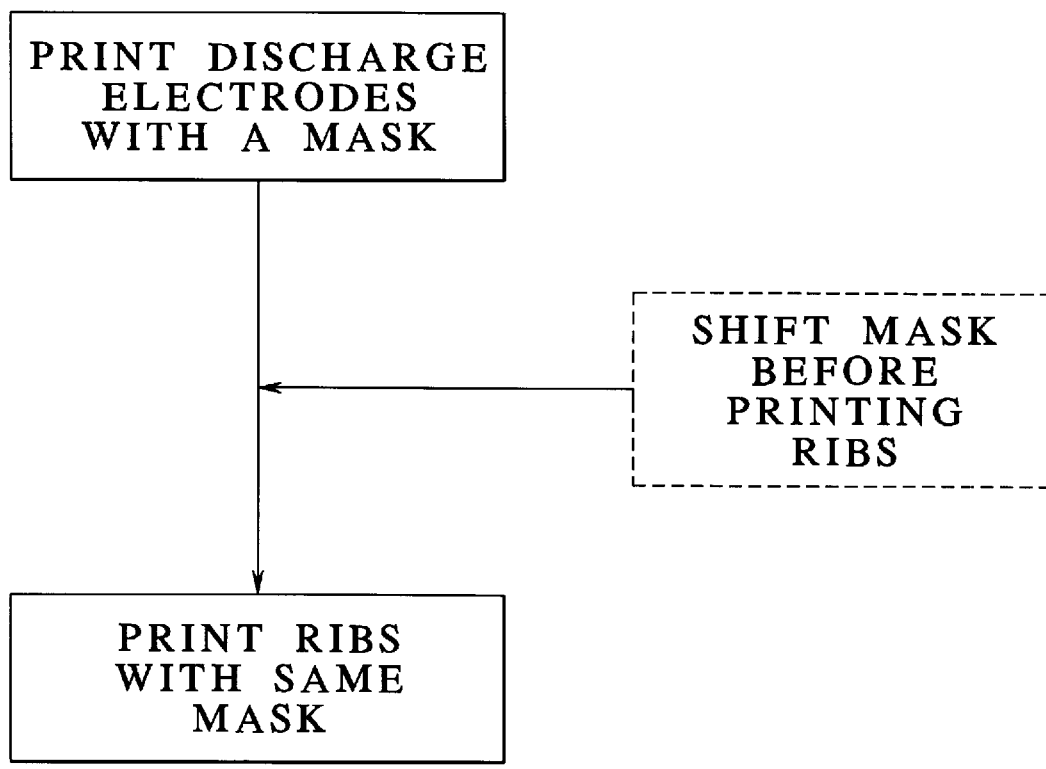
FIG. 5 is a block diagram of a method according to the present invention.

The present invention provides a method for manufacturing the discharge display panels, as described above. FIG. 5 illustrates the essential steps in the present process. In particular, the first step is to print discharge electrodes on the substrate using a mask. This step may include substeps of printing a first set of electrodes and then shifting the mask to print a second set of electrodes that are disposed between the first electrodes. In other words, anodes, for example, are first printed and then cathodes are printed between the anodes. A possible further substep provides that the mask is shift slightly after printing an electrode set and then another printing operation is performed abutting the electrode set to form wide electrodes.

The barrier ribs are then printed using the same mask as used for the electrodes. A possible adaptation of the method provides that the mask is shifted from the position for printing the electrodes to another position for printing the ribs. The shifting step may shift the mask so that the ribs are printed partially overlapping ones of the electrodes (as in FIG. 1), or may be such that the ribs are between the electrodes. If printed atop the electrodes, the barrier ribs may be atop single width electrodes (as in FIG. 3), or atop double width electrodes (as in FIG. 2).

Although other modifications and changes may be suggested by those skilled in the art, it is the intention of the inventors to embody within the patent warranted hereon all changes and modifications as reasonably and properly come within the scope of their contribution to the art.

We claim:

1. A plasma addressed electro-optical display device, comprising:

a first substrate having a plurality of signal electrodes;

a second substrate having a plurality of striped first discharge electrodes and second discharge electrodes, said first and second substrate being bonded together with a gap therebetween, the first and second discharge electrodes extending perpendicularly to the signal electrodes;

an intermediate substrate provided between the first substrate and second substrate;

an electro-optical material filled between the first substrate and the intermediate substrate to form an electro-optical layer;

a plasma discharge cell having a ionizable gas therein formed between the intermediate substrate and the second substrate, a plurality of barrier ribs extending parallel to said discharge electrodes in said plasma discharge cell to divide said plasma discharge cell into a plurality of plasma discharge channels, each of said plasma discharge channels having the discharge electrodes; and the first discharge electrodes being free of said barrier ribs and being exposed to the ionizable gas, and the second discharge electrodes being partially covered with said barrier ribs, said barrier ribs completely covering one side wall of said second discharge electrodes so that each of said second discharge electrodes have a portion covered by one of said barrier ribs and a portion exposed to said ionizable gas of said discharge channel.

2. A plasma addressed electro-optical display device as recited in claim 1, wherein each of said discharge channels has at least one of said first discharge electrodes and one of said second discharge electrodes.

3. A plasma addressed electro-optical display device as recited in claim 1, wherein said first and second discharge electrodes and said barrier ribs have a same width and a same pitch as a result of being printed by using a common screen mask.

4. A plasma addressed electro-optical display device comprising:

a first substrate having a plurality of first electrodes;

a second substrate bonded together with said first electrode and spaced therefrom by a gap, a plurality of second electrodes of a first thickness and a plurality of third electrodes provided alternately on the second substrate and being faced perpendicularly to the first electrodes, the third electrodes being of a second thickness more than the first thickness;

an intermediate substrate provided between the first substrate and second substrate;

an electro-optical material filled between the first substrate and the intermediate substrate to form a electro-optical layer;

a plasma discharge cell having an ionizable gas therein formed between the intermediate substrate and the second substrate, which has a plurality of plasma discharge channels, each of the discharge channels having the pair of electrodes including one of said second electrodes and one of said third electrodes;

a plurality of barrier ribs provided between the intermediate substrate and the second substrate to divide the plasma discharge cell into the plasma discharge channels, said barrier ribs and said second electrodes and said third electrodes being of a same width and a same pitch.

5. A plasma addressed electro-optical display device as recited in claim 4, wherein the top surface of each of said third electrodes is covered with a corresponding one of said barrier ribs, both of the side surfaces of the third electrodes being exposed to said ionizable gas so as to face said second electrodes.

* * * * *